(12) United States Patent
Chen et al.

(10) Patent No.: US 11,440,100 B2
(45) Date of Patent: Sep. 13, 2022

(54) APPARATUS AND METHOD FOR ADDITIVE MANUFACTURING BY ULTRA-HIGH-SPEED LASER CLADDING

(71) Applicant: Jiangsu University, Jiangsu (CN)

(72) Inventors: Lan Chen, Jiangsu (CN); Xudong Ren, Jiangsu (CN); Yuzhou Sun, Jiangsu (CN); Xinzhou Zhang, Jiangsu (CN); Zhaopeng Tong, Jiangsu (CN); Wangfan Zhou, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 17/298,601

(22) PCT Filed: Jul. 7, 2020

(86) PCT No.: PCT/CN2020/100519
§ 371 (c)(1),
(2) Date: May 31, 2021

(87) PCT Pub. No.: WO2021/253522
PCT Pub. Date: Dec. 23, 2021

(65) Prior Publication Data
US 2022/0203456 A1    Jun. 30, 2022

(30) Foreign Application Priority Data

Jun. 17, 2020 (CN) .......................... 2020 10554717.6

(51) Int. Cl.
*B33Y 10/00* (2015.01)
*B33Y 30/00* (2015.01)
(Continued)

(52) U.S. Cl.
CPC ............ *B22F 12/224* (2021.01); *B22F 10/28* (2021.01); *B22F 10/85* (2021.01); *B22F 12/226* (2021.01);
(Continued)

(58) Field of Classification Search
CPC ......... B33Y 10/00; B33Y 30/00; B33Y 50/00; B23K 26/34–342; B29C 64/00;
(Continued)

(56) References Cited

U.S. PATENT DOCUMENTS

2015/0102531 A1* 4/2015 El-Siblani ............. B29C 64/245
425/174
2016/0159006 A1* 6/2016 Wang .................... B29C 64/118
425/166

(Continued)

FOREIGN PATENT DOCUMENTS

CN    101787528    7/2010
CN    106392072    2/2017
(Continued)

OTHER PUBLICATIONS

"International Search Report (Form PCT/ISA/210) of PCT/CN2020/100519," dated Mar. 16, 2021, pp. 1-5.

*Primary Examiner* — Michael A Laflame, Jr.
(74) *Attorney, Agent, or Firm* — JCIP Global Inc.

(57) ABSTRACT

The present invention relates to an apparatus and method for additive manufacturing by ultra-high-speed laser cladding. The apparatus includes a laser generator, a beam expander, and a reflector. A light exit path of the reflector is arranged facing a cladding nozzle. The cladding nozzle is connected to a powder pool through a hose and a pump in succession. A matrix is arranged below the cladding nozzle. The matrix is located on a rotary platform. A main stepping motor is fixedly mounted below the rotary platform. The main stepping motor is fixed on a lifting platform. A laser rangefinder is arranged above the matrix. During the laser cladding-based additive manufacturing process, the ultrasonic vibration device, the infrared camera, the high-speed camera, the
(Continued)

laser rangefinder, and the radiological inspection system are turned on to monitor the laser cladding process in real time.

11 Claims, 11 Drawing Sheets

(51) Int. Cl.
| | |
|---|---|
| B33Y 50/00 | (2015.01) |
| B23K 26/34 | (2014.01) |
| B29C 64/00 | (2017.01) |
| B29C 64/10 | (2017.01) |
| B29C 64/20 | (2017.01) |
| B29C 64/30 | (2017.01) |
| B22F 12/00 | (2021.01) |
| B33Y 50/02 | (2015.01) |
| B23K 26/144 | (2014.01) |
| B23K 26/342 | (2014.01) |
| B23K 26/60 | (2014.01) |
| B33Y 40/10 | (2020.01) |
| B22F 12/37 | (2021.01) |
| B22F 10/85 | (2021.01) |
| B22F 12/41 | (2021.01) |
| B22F 12/90 | (2021.01) |
| B22F 10/28 | (2021.01) |
| B23K 26/03 | (2006.01) |
| B23K 26/08 | (2014.01) |
| G01B 11/06 | (2006.01) |
| G01C 3/02 | (2006.01) |

(52) U.S. Cl.
CPC .............. *B22F 12/37* (2021.01); *B22F 12/41* (2021.01); *B22F 12/90* (2021.01); *B23K 26/032* (2013.01); *B23K 26/034* (2013.01); *B23K 26/0823* (2013.01); *B23K 26/144* (2015.10); *B23K 26/342* (2015.10); *B23K 26/60* (2015.10); *B33Y 10/00* (2014.12); *B33Y 30/00* (2014.12); *B33Y 40/10* (2020.01); *B33Y 50/02* (2014.12); *G01B 11/06* (2013.01); *G01C 3/02* (2013.01)

(58) Field of Classification Search
CPC ....... B29C 64/10; B29C 64/20; B29C 64/227; B29C 64/264; B29C 64/30
See application file for complete search history.

(56) References Cited

U.S. PATENT DOCUMENTS

| | | |
|---|---|---|
| 2017/0209961 A1 | 7/2017 | Cavanaugh et al. |
| 2018/0162050 A1* | 6/2018 | Oh ........................ B29C 64/165 |
| 2018/0319097 A1 | 11/2018 | Narayanan et al. |
| 2019/0105833 A1* | 4/2019 | Cambron .............. B29C 64/241 |

FOREIGN PATENT DOCUMENTS

| | | |
|---|---|---|
| CN | 208395276 | 1/2019 |
| CN | 110216286 | 9/2019 |
| CN | 110656330 | 1/2020 |

* cited by examiner

APPARATUS AND METHOD FOR ADDITIVE MANUFACTURING BY ULTRA-HIGH-SPEED LASER CLADDING

CROSS-REFERENCE TO RELATED APPLICATION

This application is a 371 of international application of PCT application serial no. PCT/CN2020/100519, filed on Jul. 7, 2020, which claims the priority benefit of China application no. 202010554717.6, filed on Jun. 17, 2020. The entirety of each of the above mentioned patent applications is hereby incorporated by reference herein and made a part of this specification.

TECHNICAL FIELD

The present invention relates to the field of laser additive manufacturing, and more particularly to an apparatus and method for additive manufacturing by ultra-high-speed laser cladding.

BACKGROUND

Ultra-high-speed laser cladding technology is a novel surface coating technology developed in recent years. Compared with conventional laser cladding technologies, it has the following advantages: a laser spot diameter as small as 1 mm, and a smaller thickness of a single cladding layer being 20-250 μm; a very high cladding speed (up to 500 m/min); a low dilution rate of the cladding layer, which is generally only 2%-4%; a small heat-affected zone, and small workpiece deformation; and high processing precision, and low processing costs. Ultra-high-speed laser cladding technology is the first choice for repairing parts. By forming a functional cladding material layer that is completely different from the matrix and has predetermined special properties on the surface of the part, this technology can completely change the properties of the surface of the material, imparting the surface of the material with extremely high wear resistance, corrosion resistance, high temperature resistance and other properties. This technology can also be used to repair pores and cracks on the surface of the material, to restore the geometric size and performance of the worn parts.

At present, ultra-high-speed laser cladding is mostly used for processing of shaft and disc parts. An ultra-high cladding speed is obtained through the rotation of the workpiece. The movement mechanism is mainly composed of a rotating mechanism for clamping the workpiece and an XYZ three-dimensional walking mechanism for fixing a laser cladding head. However, this technology has a relatively low cladding speed for flat plates, and it is therefore necessary to realize high-speed planar movement of the cladding head and the workpiece. In addition, the application of the ultra-high-speed laser cladding technology is still in the stage of promotion, the basic research in the preparation process is not comprehensive enough, and there is still a lot of work to be done in terms of forming precision and defect control.

SUMMARY

To solve the problem that the existing ultra-high-speed laser cladding-based additive manufacturing technologies can achieve ultra-high-speed laser cladding only on a cylindrical surface, an objective of the present invention is to devise an apparatus and method for additive manufacturing on a flat plate by ultra-high-speed laser cladding.

To achieve the above objective of the present invention, the following technical solutions are adopted in the present invention: An apparatus for additive manufacturing by ultra-high-speed laser cladding, including a laser generator, a beam expander, and a reflector. A light exit path of the reflector is arranged facing a cladding nozzle. The cladding nozzle is connected to a powder pool through a hose and a pump in succession. A matrix is arranged below the cladding nozzle. The matrix is located on a rotary platform. A main stepping motor is fixedly mounted below the rotary platform. The main stepping motor is fixed on a lifting platform. A laser rangefinder is arranged above the matrix.

In the above solution, the cladding nozzle is fixed on an electric slider A, the cladding nozzle is configured to move on an electric slide rail A by the electric slider A, the electric slide rail A is fixed on an electric slider B, the electric slide rail A is configured to move on an electric slide rail B by the electric slider B, the reflector is connected to an electric slider C by a rotary shaft, and the reflector is configured to move on an electric slide rail C by the electric slider C.

In the above solution, a plurality of ultrasonic vibration platforms are arranged on the rotary platform, a matrix is placed on each of the ultrasonic vibration platforms, and each of the ultrasonic vibration platforms is configured to rotate on the rotary platform through an auxiliary stepping motor.

In the above solution, an infrared camera and a high-speed camera are arranged above the matrix.

In the above solution, a radiological inspection system is arranged above the matrix.

In the above solution, the laser generator, the pump, the lifting platform, the main stepping motor, the auxiliary stepping motor, the ultrasonic vibration platforms, the electric slider A, the electric slider B, the electric slider C, the radiological inspection system, the infrared camera, the high-speed camera, and the laser rangefinder are connected to a control system by signal cables.

In the above solution, the laser generator is a fiber laser generator with the following settings: wavelength: 1080 nm, rated output power: 4000 W, focal length: 280 mm, power adjustable range: 5-100%; fiber output interface: QCS; focal spot intensity distribution: plateau; laser operation mode: CW; output power stability: <3%; laser-dedicated cloud service remote diagnosis system; 15 m transmission fiber.

The present invention further provides a method for additive manufacturing using the apparatus for additive manufacturing by ultra-high-speed laser, including the following steps: Step S1: grinding, cleaning, blowing dry and preheating the matrix; Step S2: fixing the matrix to the ultrasonic vibration platform, and controlling the lifting platform to be fine-tuned so that there is a suitable distance H between the matrix and the nozzle; controlling the electric slider B to drive the nozzle to move to an innermost side of the rotary platform; measuring a distance D1 to the matrix by the laser rangefinder; Step S3: driving the rotary platform by the main stepping motor to start to rotate, to cause the matrix to undergo a displacement with respect to the cladding nozzle; Step S4: controlling the pump to start operating, to spray a powder from the powder pool to the surface of the matrix through the cladding nozzle; focusing a laser outputted from the laser generator onto the surface of the matrix through the nozzle, to melt the powder sprayed on the surface of the matrix; controlling the ultrasonic vibration platform to start to vibrate and rotate, so that the powder sprayed on the surface of the matrix is completely melted, to reduce formation of pores; Step S5: capturing temperature of the molten pool using the infrared camera, capturing a width of the melting pool using the high-speed camera, feeding back the temperature and the width to the control system for determining whether the powder has been sufficiently melted, and then dynamically controlling a rotating speed of the rotary platform to achieve a suitable laser energy density; dynamically controlling a vibration frequency of the ultrasonic vibration platform to sufficiently melt the powder; Step S6: measuring a distance D2 to a cladding layer using the laser rangefinder, calculating a thickness of the cladding layer by subtracting D1 from D2, determining whether the thickness of the cladding layer meets an expected requirement, and then dynamically controlling a powder feeding rate to ensure an even thickness of the cladding layer; Step S7: after the rotary platform completes one revolution, stopping the output of the laser, and stopping the feeding of the powder from the pump; driving the cladding nozzle by the electric slider B to move a distance X toward an outer side of the rotary platform; Step S8: repeating the Steps S4, S5, S6, and S7 until additive manufacturing of one layer has been completed; Step S9: stopping the rotation of the main stepping motor, performing non-contact defect detection for the obtained cladding layer using the radiological inspection system, and recording a position of a defect; Step S10: controlling the electric slider B to move along the electric slide rail B, to drive the nozzle to move to the innermost side of the rotary platform; lowering the lifting platform by a height H; causing the ultrasonic vibration platform to rotate by an angle α; Step S11: changing parameters in a process of ultra-high-speed laser cladding-based additive manufacturing of a next layer by the control system according to the position of the defect recorded by the radiological inspection system, so that when the nozzle moves over the defect, the laser power and the powder feeding rate are increased, to repair the defect by remelting; and Step S12: repeating the Steps S3, S4, S5, S6, S7, S8, S9, S10, and S11 until all additive manufacturing processes have been completed.

In the above solution, in the ultra-high-speed laser cladding-based additive manufacturing process, the nozzle moves on the electric slide rail A by the electric slider A to change an angle between an axis of the cladding nozzle and the surface of the matrix, to overcome a centrifugal force generated on the molten powder on the surface of the matrix due to rotation; the reflector is configured to rotate about an axis of rotation and move on the electric slide rail C by the electric slider C to change an angle and position of reflected light so that light is reflected by the reflector to enter the cladding nozzle; and the angle between the axis of the cladding nozzle and the surface of the matrix is determined by a distance from the cladding nozzle to the axis of the rotary platform and the rotating speed of the rotary platform.

In the above solution, in the Step S8 and the Step S12, during cladding, the laser generator has: a laser power of 3000-4000 W; a scanning speed of 1-200 m/min; a spot diameter of 1-3 mm; an overlap rate of 0-100%; and a cladding layer thickness of 10-1000 μm.

The present invention has the following beneficial effects. 1. Ultra-high-speed laser cladding is an emerging technology and is advantageous over conventional laser cladding technologies mainly due to its higher scanning speed. However, this technology can achieve ultra-high-speed laser cladding only on a cylindrical surface, and has a relatively low cladding speed which can only reach 10 m/min for flat plates. By rotation, the present invention enables the ultra-high-speed laser cladding technology to achieve a high cladding speed of up to 100 m/min on flat plates. 2. Compared with conventional laser cladding-based additive manufacturing, the use of the arc-shaped scanning path in the present invention is more advantageous in manufacturing parts with a large number of arcs. 3. Conventional laser cladding-based additive manufacturing uses a linear scanning path, and its scanning speed is limited by the screw motor. Compared with conventional cladding-based additive manufacturing, the present apparatus features a higher scanning speed and higher processing efficiency. 4. The rotation angle in the cladding process of the present apparatus can be changed easily to adapt to changing production requirements. The present apparatus allows for the simultaneous cladding of four or more parts, thereby greatly improving the production efficiency. In addition, the present apparatus supports both single-layer laser cladding and multi-layer laser cladding in additive manufacturing, which fills the technical gap that conventional high-speed laser cladding technologies cannot be applied to flat plates, and can further extend existing ultra-high-speed laser cladding-based two-dimensional additive manufacturing technologies to ultra-high-speed laser deposition-based three-dimensional additive manufacturing technologies. 5. The present apparatus is equipped with ultrasonic vibration platforms below the matrix, which facilitates the uniform melting of the powder and allows gas in the molten powder to quickly escape from the molten pool, thereby reducing the formation of pores and improving the overall performance of the parts produced. 6. The laser generator, the pump, the lifting platform, the main stepping motor, the auxiliary stepping motor, the ultrasonic vibration platforms, the electric slider A, the electric slider B, the electric slider C, the infrared camera, the high-speed camera, and the control system in the present apparatus constitute a closed-loop feedback control system, and the processing parameters are dynamically controlled to fully melt the powder, thereby reducing the formation of defects such as pores, cracks, and unmelted powder, and improving the overall performance of the parts produced. 7. The thickness of the cladding layer is controlled in real time using the laser rangefinder, so as to make the thickness of the cladding layer uniform and improve the overall performance of the parts produced. 8. Defects generated in the cladding process of one layer are repaired in the cladding process of a next layer using the ultrasonic inspection system, which greatly reduces the internal defects of the parts produced and improves the comprehensive performance of the parts produced. 9. The apparatus and method provided in the present invention can also extend existing ultra-high-speed laser cladding-based two-dimensional additive manufacturing technologies to ultra-high-speed laser deposition-based three-dimensional additive manufacturing technologies, and can overcome the deficiencies in the efficiency and precision aspects of conventional three-dimensional additive manufacturing technologies, thereby broadening and promoting the application of ultra-high-speed laser deposition technologies.

In the figures: 1. Laser generator; 2. Beam expander; 3. Parallel beams; 4. Reflector; 5. Signal cable; 6. Powder pool; 7. Pump; 8. Hose; 9. Control system; 10. Lifting platform; 11. Main stepping motor; 12. Auxiliary stepping motor; 13. Rotary platform; 14. Matrix; 15. Ultrasonic vibration platform; 16. Radiological inspection system; 17. Cladding nozzle; 18. Infrared camera; 19. High-speed camera; 20. Laser rangefinder; 21. Electric slider A; 22. Electric slide rail A; 23. Electric slider B; 24. Electric slide rail B; 25. Electric slider C; 26. Electric slide rail C.

DETAILED DESCRIPTION OF THE EMBODIMENTS

The technical solutions of the present invention will be further described in detail below with reference to the accompanying drawings and specific embodiments.

Figure 1:
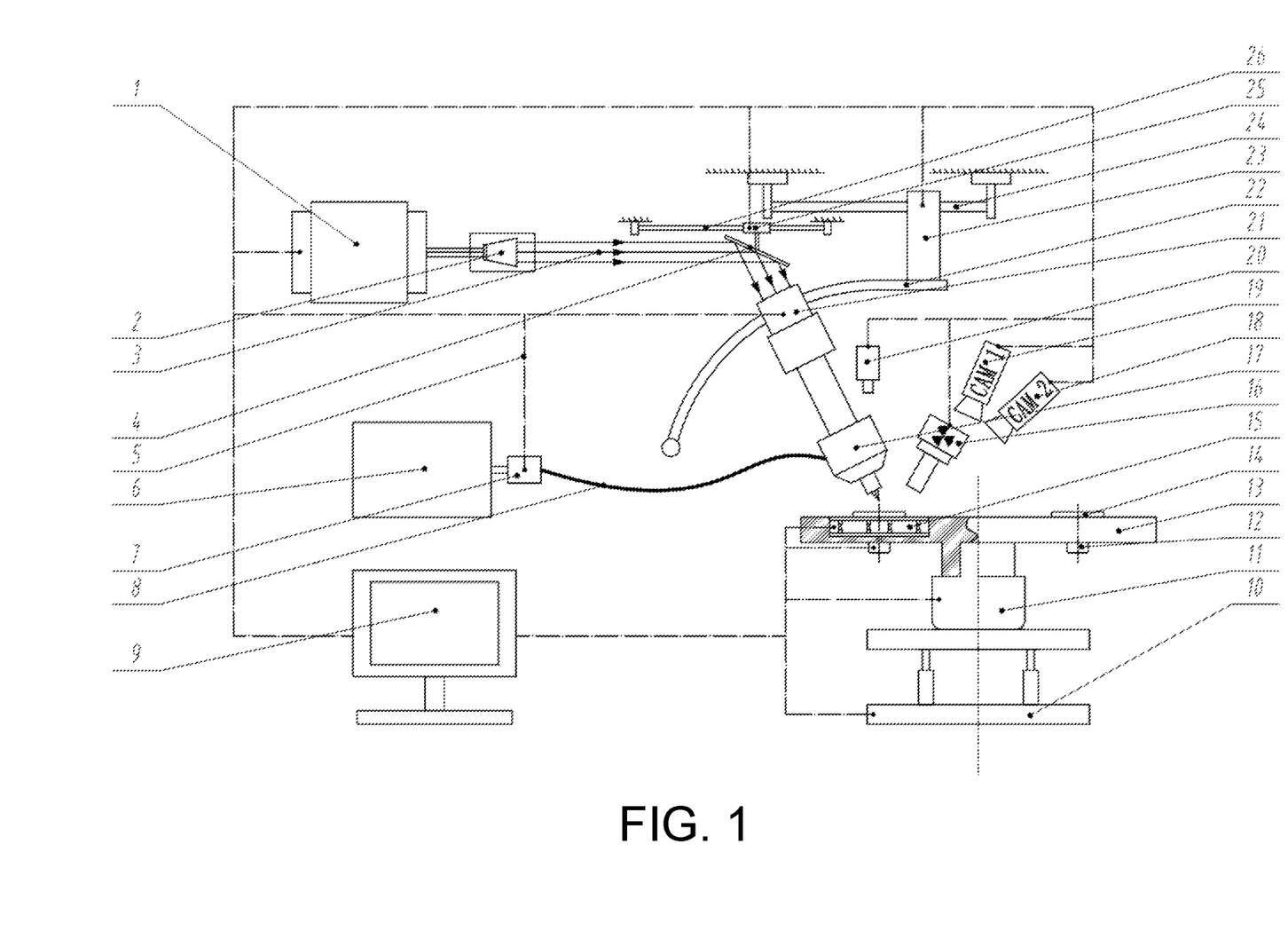
FIG. 1 is a schematic view of an apparatus according to the present invention.
Figure 2:
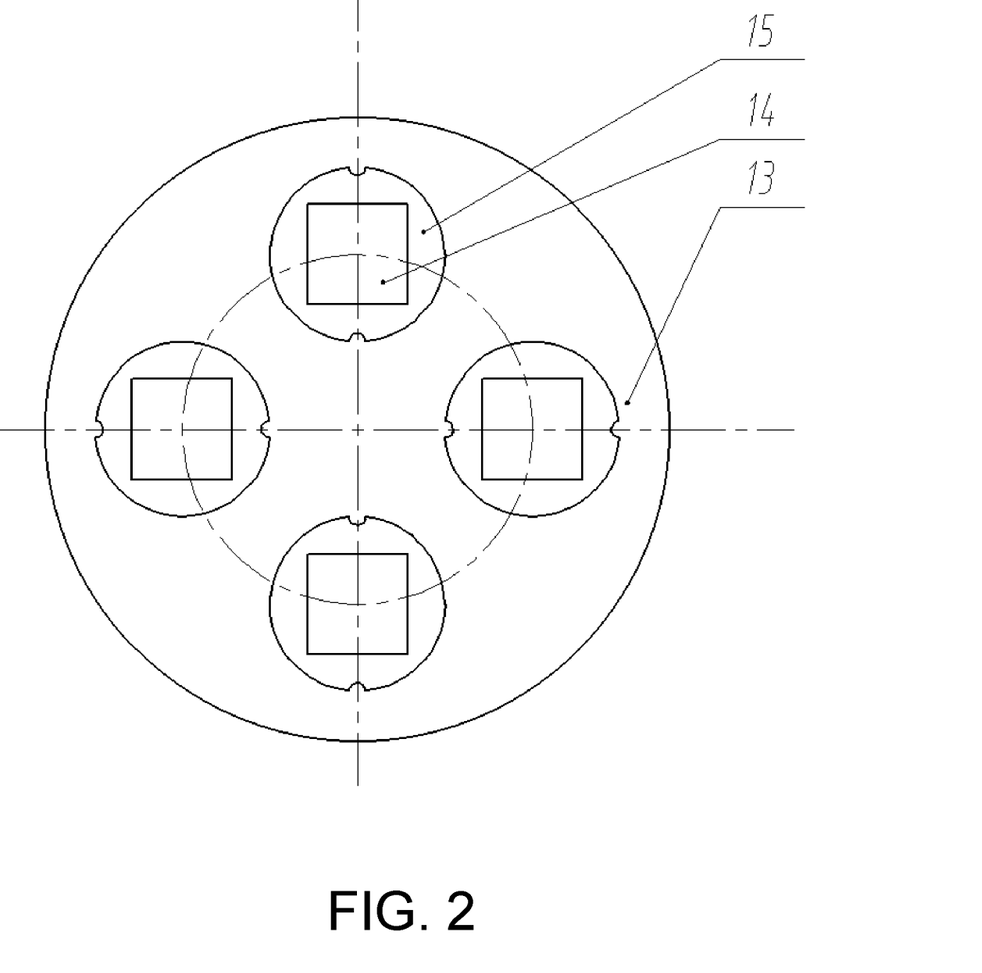
FIG. 2 is a top view of a rotary platform in the apparatus according to the present invention.

As shown in FIG. 1 and FIG. 2, an apparatus for additive manufacturing by ultra-high-speed laser cladding according to an embodiment includes a laser generator 1 and a beam expander 2. The beam expander 2 is configured to expand an incident laser into parallel laser beams 3. The parallel laser beams 3 are reflected by a reflector 4 to enter a cladding nozzle 17, and are focused on a matrix 14 by a lens in the cladding nozzle. The cladding nozzle 17 is fixed on an electric slider A 21 and can move on an electric slide rail A 22. The electric slide rail A 22 is fixed on an electric slider B 23 and can move on an electric slide rail B 24. The reflector 4 is connected to an electric slider C 25 by a rotary shaft and can move along an electric slide rail C 26. The matrix 14 is fixed on an ultrasonic vibration platform 15. The ultrasonic vibration platform 15 is embedded on a rotary platform 13 and is configured to be driven by an auxiliary stepping motor 12 to rotate inside the rotary platform 13. The rotary platform 3 is connected to a main stepping motor 11 and can be driven by the main stepping motor to rotate. The main stepping motor 11 is fixed on a lifting platform 10, and can be lifted up and down. A powder is fed from a powder pool 6 through a hose 8 to the cladding nozzle 17 by a pump 7, sprayed onto the matrix 14, and melted by a laser focused on the surface of the matrix 14.

The laser generator 1, the pump 7, the lifting platform 10, the main stepping motor 11, the auxiliary stepping motor 12, the ultrasonic vibration platform 15, the electric slider A 21, the electric slider B 23, the electric slider C 25, the radiological inspection system 16, the infrared camera 18, the high-speed camera 19, and the laser rangefinder 20 are connected to a control system 9 by signal cables 5 and controlled by the control system. A plurality of ultrasonic vibration platforms 15 may be mounted on the rotary platform 13, and correspondingly a plurality of matrices 14 are mounted. In this way, multiple parts can be additively manufactured at a time, which greatly improves the production efficiency.

Figure 3:
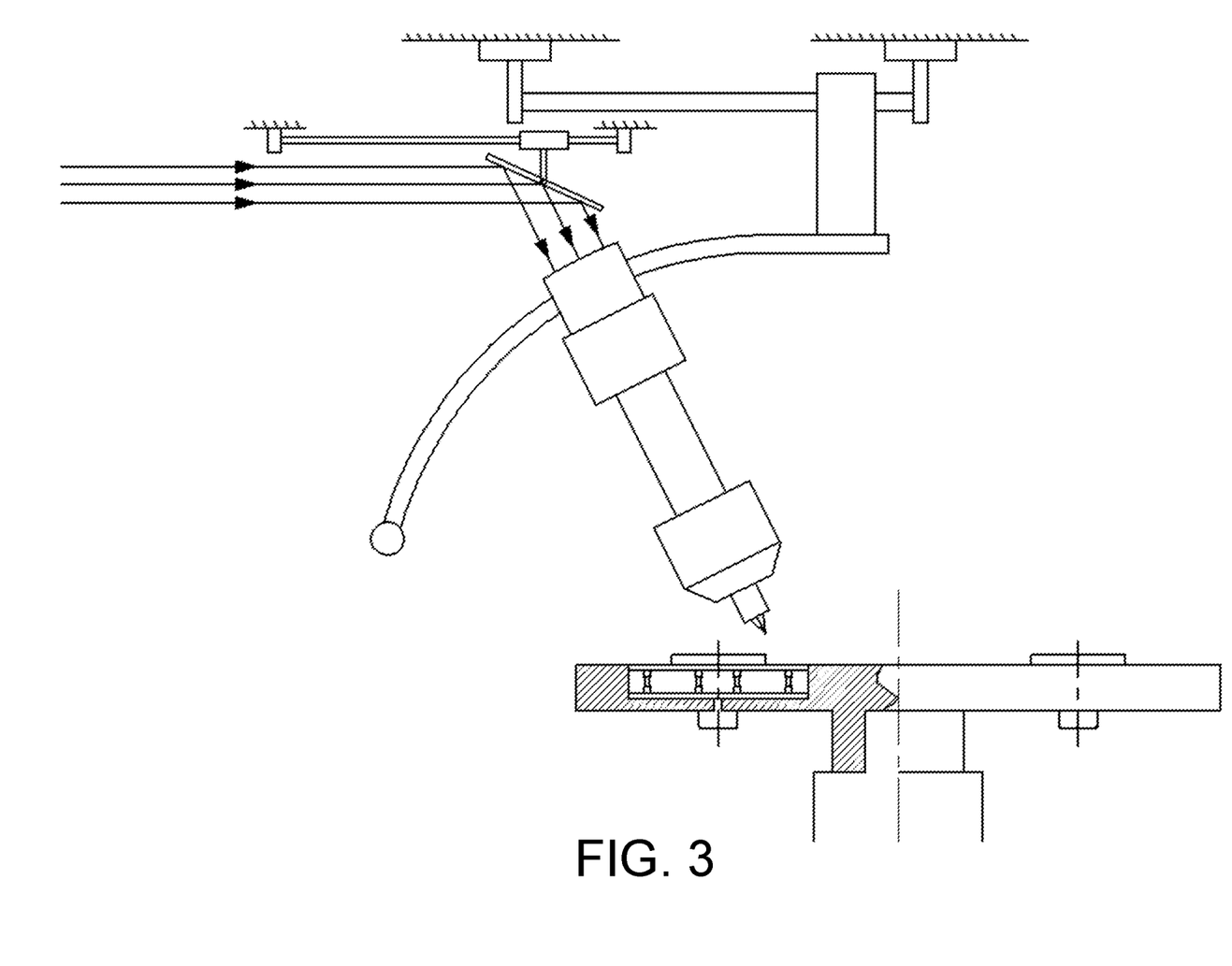
FIG. 3 shows control of the electric slider B to drive the cladding nozzle to move to an innermost side of the rotary platform.
Figure 4:
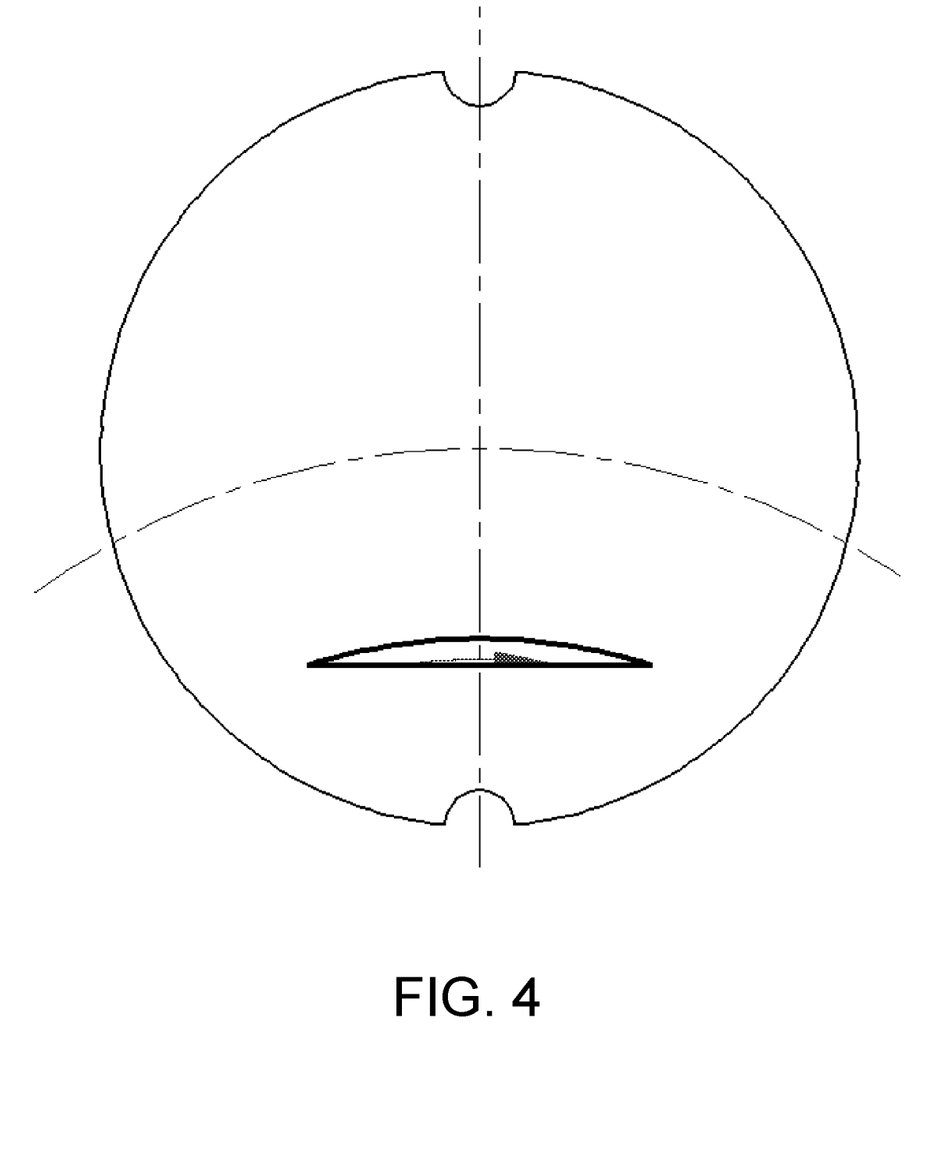
FIG. 4 is a view of a cladding track formed by melting powder on the surface using a laser.
Figure 5:
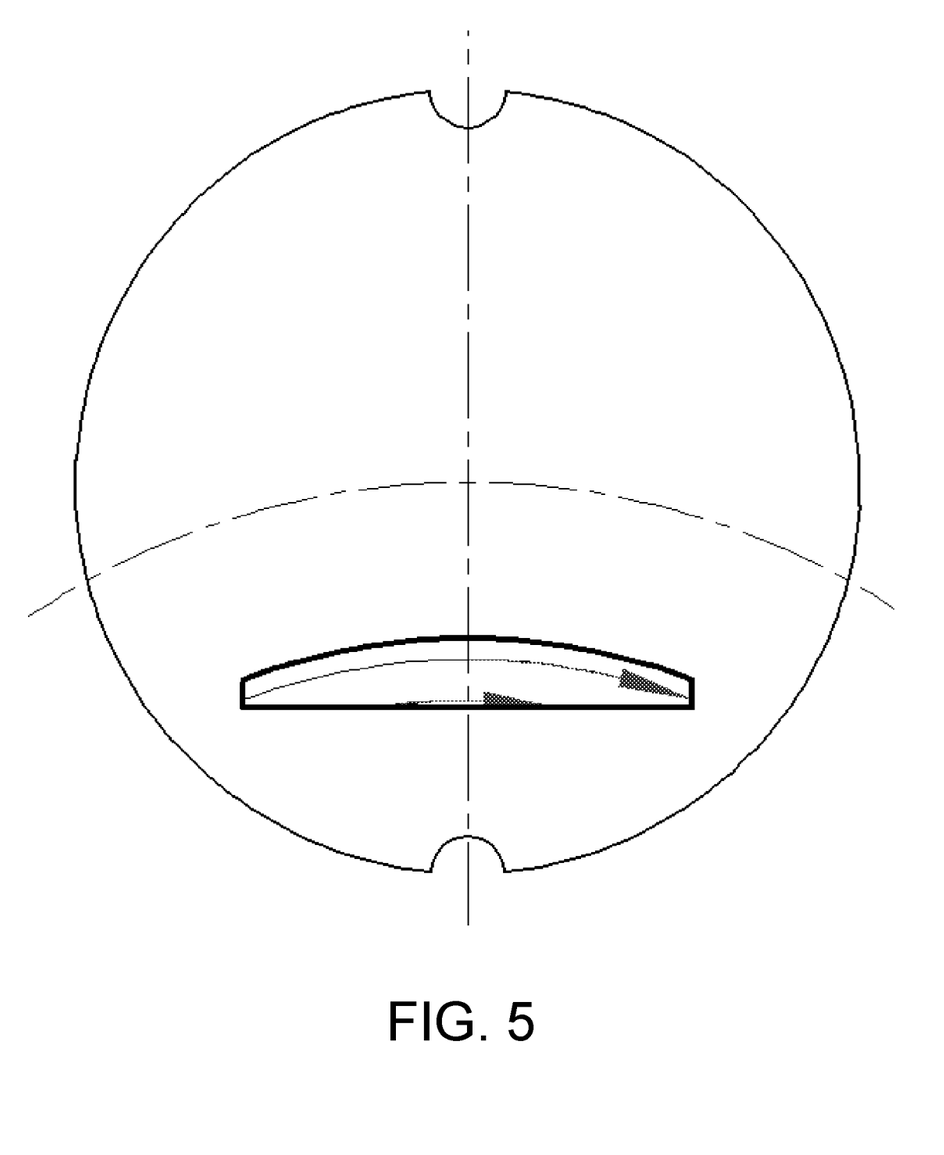
FIG. 5 to FIG. 7 are views showing a process of cladding-based additive manufacturing of one layer.
Figure 6:
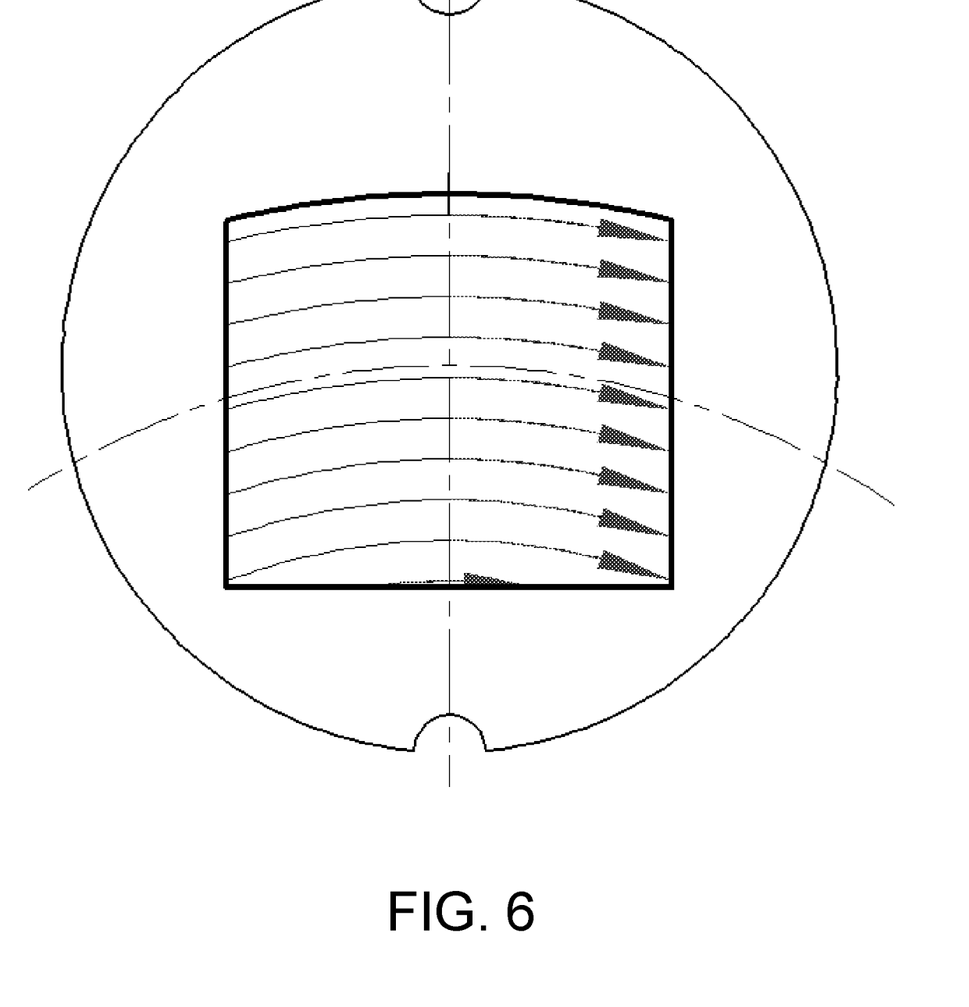
Figure 7:
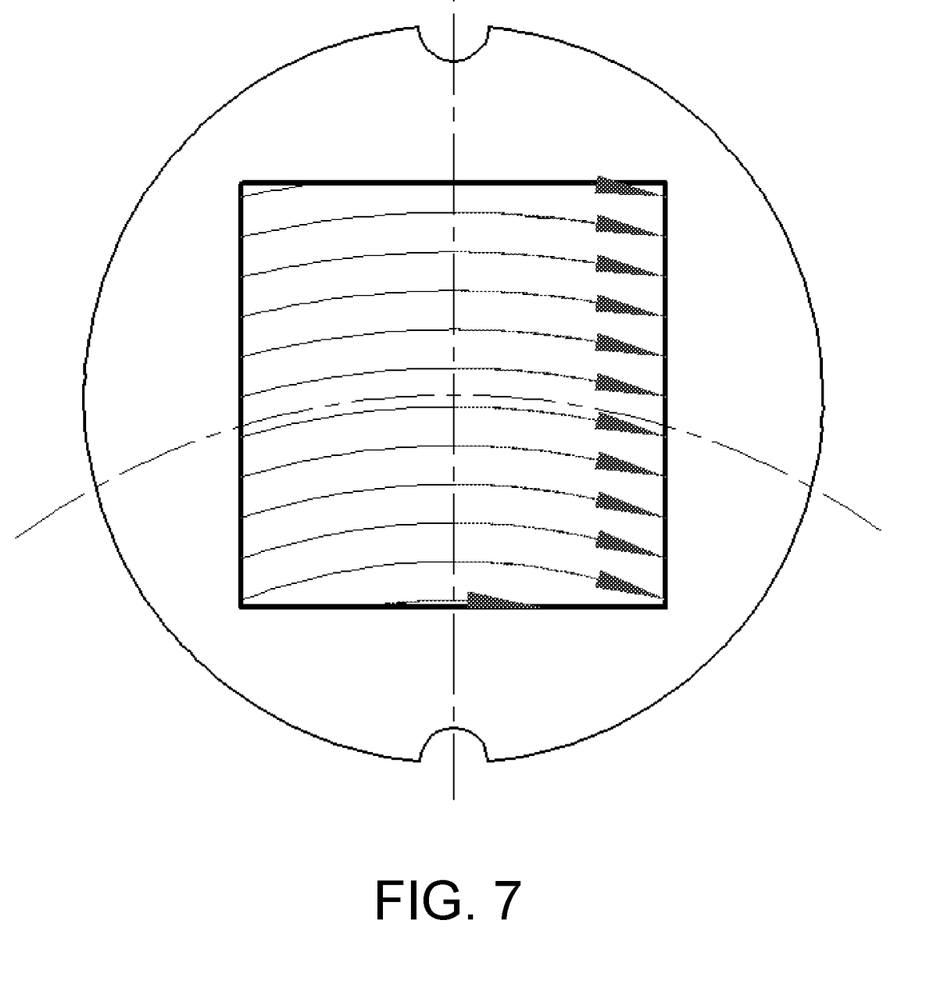
Figure 8:
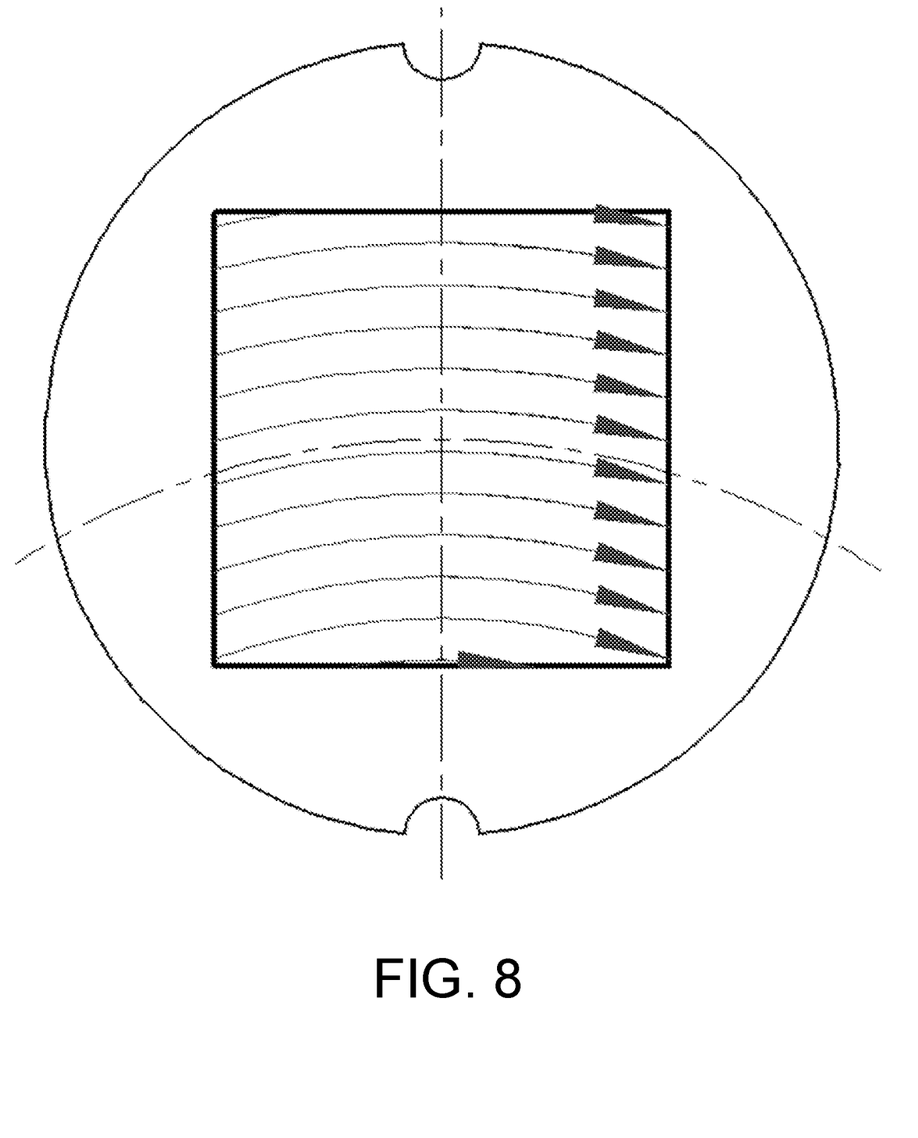
FIG. 8 to FIG. 9 are views showing a process of cladding-based additive manufacturing after the ultrasonic vibration platform is rotated by an angle α.
Figure 9:
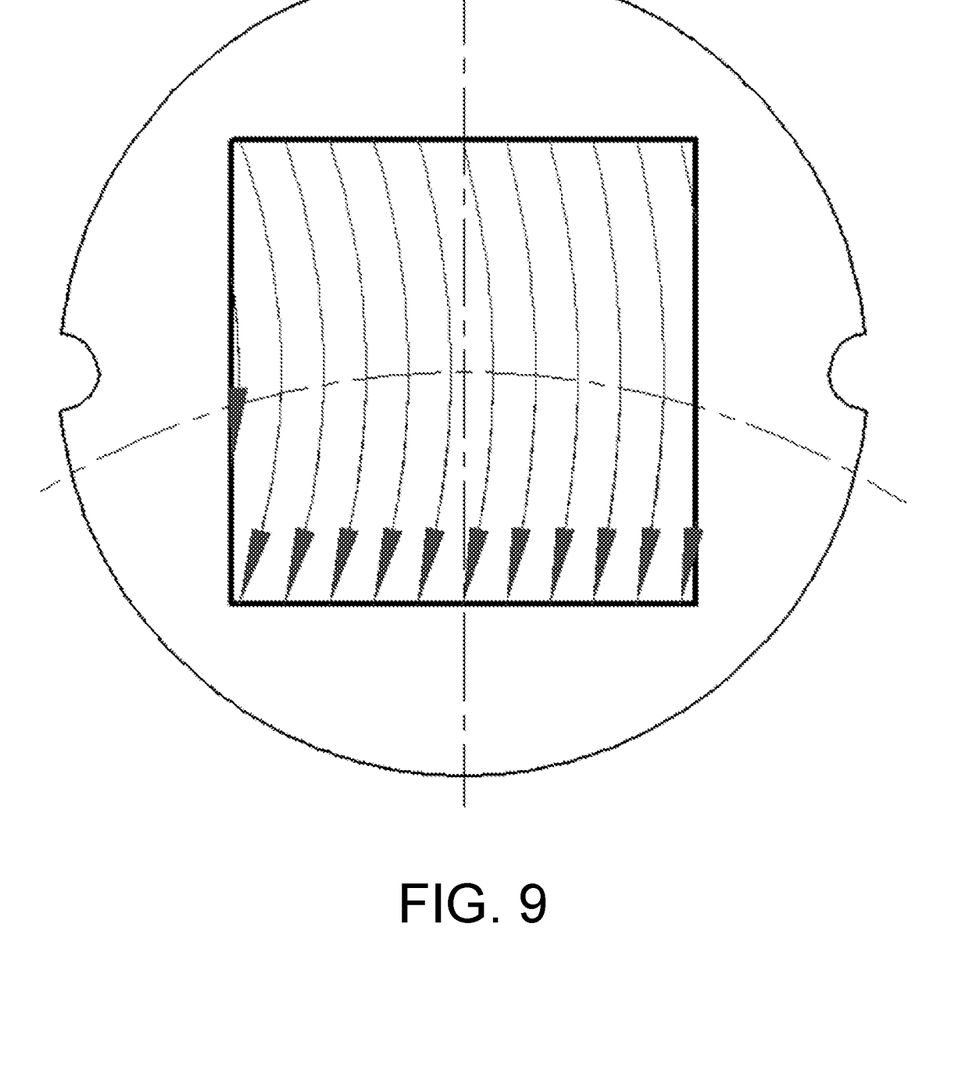
Figure 10:
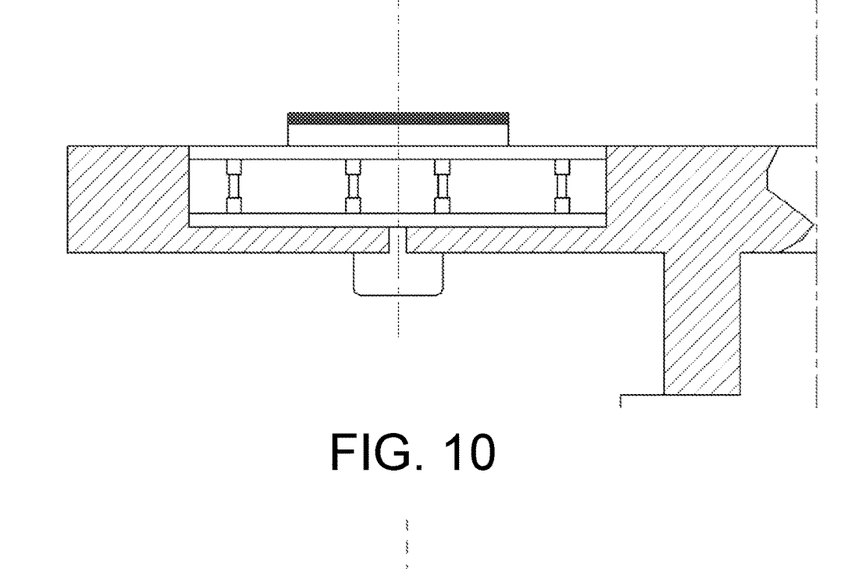
FIG. 10 to FIG. 13 are schematic views showing a cladding-based additive manufacturing process.
Figure 11:
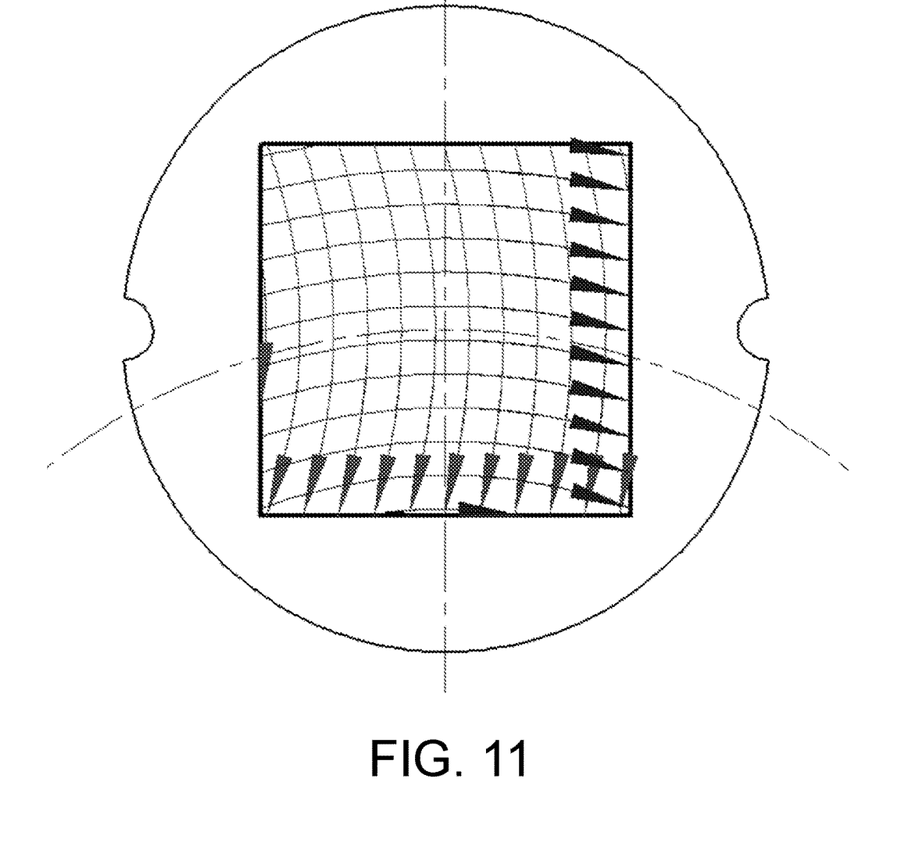
Figure 12:
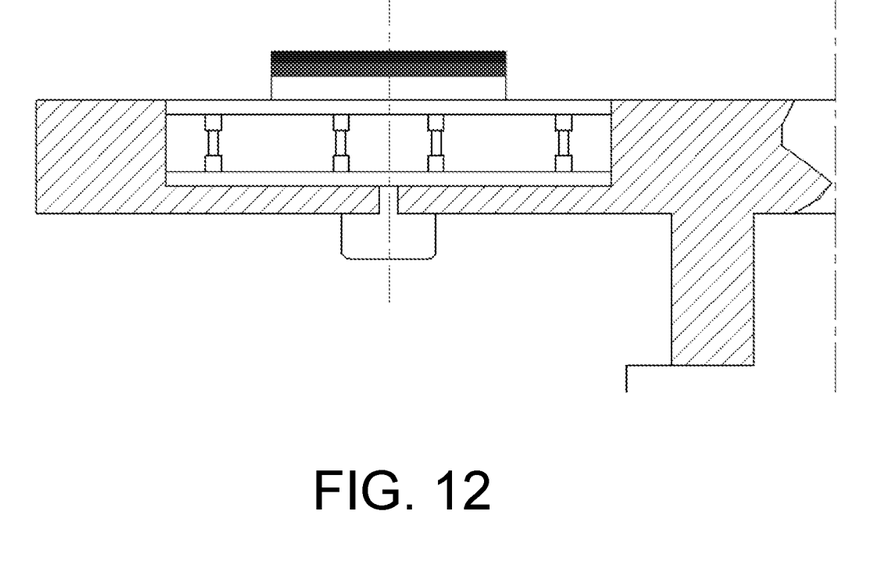
Figure 13:
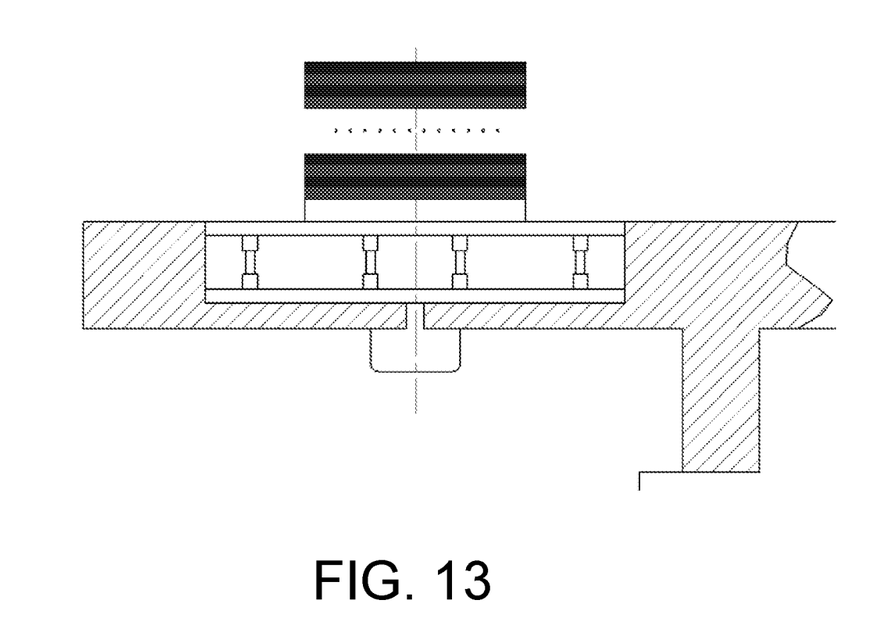

Taking Inconel625 alloy as an example below, the present invention includes the following steps. A. The matrix 14 is ground, cleaned, blown dry, and preheated to 300° C. B. The matrix 14 is fixed to the ultrasonic vibration platform 15, and the lifting platform 10 is controlled to be fine-tuned so that there is a suitable distance H between the matrix 14 and the nozzle 17; the electric slider B 23 is controlled to drive the nozzle 17 to move to an innermost side of the rotary platform 13, as shown in FIG. 3; and the laser rangefinder 20 measures a distance D1 to the matrix 14. C. The rotary platform 13 is driven by the main stepping motor 11 to start to rotate, to cause the matrix 14 to undergo a displacement with respect to the nozzle 17, where the stepping motor has a step angle of 1.8° and a holding torque of 20 N·m. D. The pump 7 starts operating, to spray the powder from the powder pool 6 to the surface of the matrix 14 through the nozzle 17; a laser outputted from the laser generator 1 is focused onto the surface of the matrix 14 through the nozzle 17, to melt the powder sprayed on the surface of the matrix 14 to form a cladding track, as shown in FIG. 4; and the ultrasonic vibration platform 15 starts to vibrate and rotate, so that the powder sprayed on the surface of the matrix 14 is completely melted to reduce formation of pores, where the laser generator 1 is a fiber laser generator, and initial parameter settings of the fiber laser generator are as follows: laser power: 2000 W; spot diameter: 1 mm; overlap rate: 50%; cladding speed: 100 m/min; and cladding layer thickness: 20 μm. E. Temperature of the molten pool is captured using the infrared camera 18, a width of the molten pool is captured using the high-speed camera 19, the temperature and the width are fed back to the control system 9 for determining whether the powder has been sufficiently melted, and then a rotating speed of the rotary platform 13 is dynamically controlled to achieve a suitable laser energy density; and a vibration frequency of the ultrasonic vibration platform 15 is dynamically controlled to sufficiently melt the powder, where the infrared camera 18 has a temperature measurement range of 800-4000° C., a measurement precision of ±1%° reading, a repeated measurement precision of ±0.5%° reading, and a detection response time of 20 ms, and the high-speed camera (19) has a maximum resolution of 1280×896, a full frame rate of 30000 fps, and an image depth of 12 bits. F. A distance D2 to a cladding layer is measured using the laser rangefinder 20, a thickness of the cladding layer is calculated by subtracting D1 from D2, it is determined whether the thickness of the cladding layer meets an expected requirement, and then a powder feeding rate is dynamically controlled to ensure an even thickness of the cladding layer, where the laser rangefinder 20 has a resolution of 1 μm, a measurement speed of 1 MHz, and a measurement range of 500 mm. G. After the rotary platform 13 completes one revolution, the output of the laser is stopped, and the feeding of the powder from the pump 7 is stopped; and the nozzle 17 is driven by the electric slider B 23 to move a distance X toward an outer side of the rotary platform 13. H. The steps D, E, F, and G are repeated until additive manufacturing of one layer has been completed, as shown in FIG. 5 to FIG. 7. I. The rotation of the main stepping motor 11 is stopped, non-contact defect detection is performed for the obtained cladding layer using the radiological inspection system 16, and a position of a defect is recorded, where the radiological inspection system has a resolution of 0.5 μm and a detection range of 30 mm. J. The electric slider B 23 is controlled to drive the nozzle 17 to move to an innermost side of the rotary platform 13; the lifting platform 10 is lowered by a height H; and the ultrasonic vibration platform 15 is caused to rotate by an angle α, as shown in FIG. 8 to FIG. 9, where the electric slider B 23 has a maximum stroke of 1.8 m and a maximum load of 200 N. K. The control system 9 changes parameters in a process of ultra-high-speed laser cladding-based additive manufacturing of a next layer according to the position of the defect recorded by the radiological inspection system 16, so that when the nozzle 17 moves over the defect, the laser power and the powder feeding rate are increased, to repair the defect by remelting. H. The steps C, D, E, F, G, H, I, J, and K are repeated until all additive manufacturing processes have been completed, as shown in FIG. 10 to FIG. 13.

In the cladding processes of the steps H and L, reference parameters are as follows: The laser generator 1 has a laser power of 4000 W; a scanning speed of 80 m/min; a spot diameter of 2 mm; an overlap rate of 50%; and a cladding layer thickness of 500 μm.

In the ultra-high-speed laser cladding-based additive manufacturing process, the nozzle 17 can move on the electric slide rail A 22 by the electric slider A 21 to change an angle between an axis of the nozzle 17 and the surface of the matrix 14, to overcome a centrifugal force generated on the molten powder on the surface of the matrix due to rotation. The reflector can rotate about an axis of rotation and move on the electric slide rail C by the electric slider C to change an angle of reflected light so that light can be reflected by the reflector to enter the nozzle. The angle between the axis of the cladding nozzle and the surface of the matrix is determined by a distance from the cladding nozzle to the axis of the rotary platform and the rotating speed of the rotary platform.

What is claimed is:

1. An apparatus for additive manufacturing by ultra-high-speed laser cladding, comprising a laser generator, a beam expander, and a reflector, wherein a light exit path of the reflector is arranged facing a cladding nozzle, the cladding nozzle is connected to a powder pool through a hose and a pump in succession, a matrix is arranged below the cladding nozzle, the matrix is located on a rotary platform, a main stepping motor is fixedly mounted below the rotary platform, the main stepping motor is fixed on a lifting platform, and a laser rangefinder is arranged above the matrix, wherein the cladding nozzle is fixed on an electric slider A, the cladding nozzle is configured to move on an electric slide rail A by the electric slider A, the electric slide rail A is fixed on an electric slider B, the electric slide rail A is configured to move on an electric slide rail B by the electric slider B, the reflector is connected to an electric slider C by a rotary shaft, and the reflector is configured to move on an electric slide rail C by the electric slider C, wherein a plurality of ultrasonic vibration platforms is arranged on the rotary platform, the matrix is placed on each of the ultrasonic vibration platforms, and each of the ultrasonic vibration platforms is configured to rotate on the rotary platform through an auxiliary stepping motor.

2. The apparatus for additive manufacturing by ultra-high-speed laser cladding according to claim 1, wherein an infrared camera and a high-speed camera are arranged above the matrix.

3. The apparatus for additive manufacturing by ultra-high-speed laser cladding according to claim 2, wherein a radiological inspection system is arranged above the matrix.

4. The apparatus for additive manufacturing by ultra-high-speed laser cladding according to claim 3, wherein the laser generator, the pump, the lifting platform, the main stepping motor, the auxiliary stepping motor, the ultrasonic vibration platforms, the electric slider A, the electric slider B, the electric slider C, the radiological inspection system, the infrared camera, the high-speed camera, and the laser rangefinder are connected to a control system by signal cables.

5. The apparatus for additive manufacturing by ultra-high-speed laser cladding according to claim 1, wherein the laser generator is a fiber laser generator with the following settings: wavelength: 1080 nm, rated output power: 4000 W, focal length: 280 mm, power adjustable range: 5-100%; fiber output interface: QCS; focal spot intensity distribution: plateau; laser operation mode: CW; output power stability: <3%; laser-dedicated cloud service remote diagnosis system; 15 m transmission fiber.

6. A method for additive manufacturing using the apparatus for additive manufacturing by ultra-high-speed laser cladding of claim 4, comprising the following steps:

Step S1: grinding, cleaning, blowing dry and preheating the matrix;

Step S2: fixing the matrix to the ultrasonic vibration platform, and controlling the lifting platform to be fine-tuned so that there is a suitable distance H between the matrix and the nozzle; controlling the electric slider B to drive the nozzle to move to an innermost side of the rotary platform; measuring a distance D1 to the matrix by the laser rangefinder;

Step S3: driving the rotary platform by the main stepping motor to start to rotate, to cause the matrix to undergo a displacement with respect to the cladding nozzle;

Step S4: controlling the pump to start operating, to spray a powder from the powder pool to the surface of the matrix through the cladding nozzle; focusing a laser outputted from the laser generator onto the surface of the matrix through the nozzle, to melt the powder sprayed on the surface of the matrix; controlling the ultrasonic vibration platform to start to vibrate and rotate, so that the powder sprayed on the surface of the matrix is completely melted, to reduce formation of pores;

Step S5: capturing temperature of the molten pool using the infrared camera, capturing a width of the molten pool using the high-speed camera, feeding back the temperature and the width to the control system for determining whether the powder has been sufficiently melted, and then dynamically controlling a rotating speed of the rotary platform to achieve a suitable laser energy density; dynamically controlling a vibration frequency of the ultrasonic vibration platform to sufficiently melt the powder;

Step S6: measuring a distance D2 to a cladding layer using the laser rangefinder, calculating a thickness of the cladding layer by subtracting D1 from D2, determining whether the thickness of the cladding layer meets an expected requirement, and then dynamically controlling a powder feeding rate to ensure an even thickness of the cladding layer;

Step S7: after the rotary platform completes one revolution, stopping the output of the laser, and stopping the feeding of the powder from the pump; driving the cladding nozzle by the electric slider B to move a distance X toward an outer side of the rotary platform;

Step S8: repeating the Steps S4, S5, S6, and S7 until additive manufacturing of one layer has been completed;

Step S9: stopping the rotation of the main stepping motor, performing non-contact defect detection for the obtained cladding layer using the radiological inspection system, and recording a position of a defect;

Step S10: controlling the electric slider B to move along the electric slide rail B, to drive the nozzle to move to the innermost side of the rotary platform; lowering the lifting platform by a height H; causing the ultrasonic vibration platform to rotate by an angle α;

Step S11: changing parameters in a process of ultra-high-speed laser cladding-based additive manufacturing of a next layer by the control system according to the position of the defect recorded by the radiological inspection system, so that when the nozzle moves over the defect, the laser power and the powder feeding rate are increased, to repair the defect by remelting; and Step S12: repeating the Steps S3, S4, S5, S6, S7, S8, S9, S10, and S11 until all additive manufacturing processes have been completed.

7. The method for additive manufacturing according to claim 6, wherein in the ultra-high-speed laser cladding-based additive manufacturing process, the nozzle moves on the electric slide rail A by the electric slider A to change an angle between an axis of the cladding nozzle and the surface of the matrix, to overcome a centrifugal force generated on the molten powder on the surface of the matrix due to rotation; the reflector is configured to rotate about an axis of rotation and move on the electric slide rail C by the electric slider C to change an angle and position of reflected light so that light is reflected by the reflector to enter the cladding nozzle; and the angle between the axis of the cladding nozzle and the surface of the matrix is determined by a distance from the cladding nozzle to the axis of the rotary platform and the rotating speed of the rotary platform.

8. The method for additive manufacturing according to claim 6, wherein in the Step S8 and the Step S12, during cladding, the laser generator has: a laser power of 3000-4000 W; a scanning speed of 1-200 m/min; a spot diameter of 1-3 mm; an overlap rate of 0-100%; and a cladding layer thickness of 10-1000 μm.

9. The apparatus for additive manufacturing by ultra-high-speed laser cladding according to claim 2, wherein the laser generator is a fiber laser generator with the following settings: wavelength: 1080 nm, rated output power: 4000 W, focal length: 280 mm, power adjustable range: 5-100%; fiber output interface: QCS; focal spot intensity distribution: plateau; laser operation mode: CW; output power stability: <3%; laser-dedicated cloud service remote diagnosis system; 15 m transmission fiber.

10. The apparatus for additive manufacturing by ultra-high-speed laser cladding according to claim 3, wherein the laser generator is a fiber laser generator with the following settings: wavelength: 1080 nm, rated output power: 4000 W, focal length: 280 mm, power adjustable range: 5-100%; fiber output interface: QCS; focal spot intensity distribution: plateau; laser operation mode: CW; output power stability: <3%; laser-dedicated cloud service remote diagnosis system; 15 m transmission fiber.

11. The apparatus for additive manufacturing by ultra-high-speed laser cladding according to claim 4, wherein the laser generator is a fiber laser generator with the following settings: wavelength: 1080 nm, rated output power: 4000 W, focal length: 280 mm, power adjustable range: 5-100%; fiber output interface: QCS; focal spot intensity distribution: plateau; laser operation mode: CW; output power stability: <3%; laser-dedicated cloud service remote diagnosis system; 15 m transmission fiber.

\* \* \* \* \*